US012786809B2

(12) United States Patent
Yang

(10) Patent No.: US 12,786,809 B2
(45) Date of Patent: Nov. 3, 2026

(54) METHOD, APPARATUS AND DEVICE FOR PROCESSING SECONDARY NODE (SN) RADIO RESOURCE CONTROL (RRC) MESSAGE, AND STORAGE MEDIUM

(71) Applicant: GUANGDONG OPPO MOBILE TELECOMMUNICATIONS CORP., LTD., Dongguan (CN)

(72) Inventor: Ning Yang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 386 days.

(21) Appl. No.: 17/481,139

(22) Filed: Sep. 21, 2021

(65) Prior Publication Data

US 2022/0007247 A1 Jan. 6, 2022

Related U.S. Application Data

(63) Continuation of application No. PCT/CN2019/109385, filed on Sep. 30, 2019.

(51) Int. Cl.
*H04W 36/00* (2009.01)
*H04W 36/36* (2009.01)

(52) U.S. Cl.
CPC ... *H04W 36/0058* (2018.08); *H04W 36/0066* (2013.01); *H04W 36/362* (2023.05); *H04W 36/00698* (2023.05)

(58) Field of Classification Search
CPC ............................................. H04W 36/00837
See application file for complete search history.

(56) References Cited

U.S. PATENT DOCUMENTS 9,820,332 B2 * 11/2017 Lee ........................ H04W 76/38
10,292,081 B2 5/2019 Lee et al.
2016/0044744 A1 * 2/2016 Lee ........................ H04W 16/32 370/329
2016/0135095 A1 * 5/2016 Wu ................... H04W 36/0027 370/328
2016/0219603 A1 7/2016 Fujishiro et al.
2016/0219604 A1 7/2016 Fujishiro et al.
2017/0019945 A1 * 1/2017 Chiba ................... H04W 76/15

(Continued)

FOREIGN PATENT DOCUMENTS

CN 102083154 A 6/2011
CN 105592549 A 5/2016

(Continued)

OTHER PUBLICATIONS

Third Office Action of the Chinese application No. 202110507847.9, issued on Feb. 15, 2023. 14 pages with English translation.

(Continued)

*Primary Examiner* — Guang W Li
(74) *Attorney, Agent, or Firm* — ASHURST PERKINS COIE US LLP

(57) ABSTRACT

A method for processing a Secondary Node Radio Resource Control (SN RRC) message includes: when it is determined that a triggering condition is satisfied, User Equipment (UE) performs a first Primary Secondary Cell (PSCell) change; and the UE stops receiving a first SN RRC message from a source Secondary Node (SN) during the first PSCell change.

15 Claims, 8 Drawing Sheets

(56) References Cited

U.S. PATENT DOCUMENTS

| | | | | |
|---|---|---|---|---|
| 2018/0227819 | A1* | 8/2018 | Lee | H04W 36/0016 |
| 2018/0309628 | A1* | 10/2018 | Wu | H04W 76/27 |
| 2019/0182881 | A1* | 6/2019 | Teyeb | H04L 5/001 |
| 2020/0029389 | A1* | 1/2020 | Yilmaz | H04W 8/08 |
| 2020/0169906 | A1* | 5/2020 | Tsuboi | H04W 36/0085 |
| 2020/0267631 | A1* | 8/2020 | Yilmaz | H04W 48/08 |
| 2020/0351694 | A1* | 11/2020 | Chen | H04W 36/0083 |
| 2020/0396661 | A1* | 12/2020 | Wu | H04W 36/0058 |
| 2020/0404725 | A1* | 12/2020 | Palat | H04W 76/15 |
| 2021/0099926 | A1* | 4/2021 | Chen | H04L 5/001 |
| 2021/0352543 | A1* | 11/2021 | Purkayastha | H04W 36/0058 |
| 2021/0400760 | A1* | 12/2021 | Yang | H04W 36/0077 |
| 2022/0007247 | A1* | 1/2022 | Yang | H04W 36/0058 |
| 2022/0038968 | A1* | 2/2022 | Latheef | H04W 36/305 |
| 2022/0046495 | A1* | 2/2022 | Lee | H04W 36/362 |
| 2022/0086704 | A1* | 3/2022 | Futaki | H04W 36/0027 |
| 2022/0167233 | A1* | 5/2022 | Shi | H04W 36/0058 |
| 2022/0217586 | A1* | 7/2022 | Yang | H04W 36/0027 |
| 2022/0287126 | A1* | 9/2022 | Orsino | H04W 76/20 |
| 2022/0369173 | A1* | 11/2022 | Deng | H04W 36/00692 |
| 2022/0369415 | A1* | 11/2022 | Peng | H04W 76/11 |
| 2022/0408322 | A1* | 12/2022 | Uchino | H04W 76/10 |
| 2023/0095601 | A1* | 3/2023 | Wu | H04W 36/34 370/331 |
| 2023/0354116 | A1* | 11/2023 | Jung | H04W 36/00692 |

FOREIGN PATENT DOCUMENTS

| | | | |
|---|---|---|---|
| CN | 107872876 | A | 4/2018 |
| CN | 109548095 | A | 3/2019 |
| CN | 109819491 | A | 5/2019 |
| CN | 110022588 | A | 7/2019 |
| CN | 110198550 | A | 9/2019 |
| CN | 110198556 | A | 9/2019 |
| EP | 3101972 | A1 | 12/2016 |
| EP | 3178287 | A1 | 6/2017 |
| WO | 2018231136 | A1 | 12/2018 |

OTHER PUBLICATIONS

3GPP TSG RAN "Evolved Universal Terrestrial Radio Access (E-UTRA) and Evolved Universal Terrestrial Radio Access Network(E-UTRAN); Overall description; Stage 2(Release 12)", 3GPP Standard; 36300-C40, Jan. 5, 2015 (Jan. 5, 2015), XP050907554. 251 pages.

Ericsson: "MN-initiated SN modification", 3GPP Draft; R2-1801078; 3GPP; RAN WG2 Vancouver, Canada; Dec. 22, 2018-Dec. 26, 2018 Jan. 11, 2018 (Jan. 11, 2018 ),XP051385876. 3 pages.

First Office Action of the Chinese application No. 202110507847.9, issued on Feb. 25, 2022. 12 pages with English translation.

Huawei "Introduction of conditiona SN change procedure", 3GPP Draft• R3-194117;3GPP; RAN WG3, Ljubljana, Slovenia; Aug. 26, 2019-Aug. 30, 2019 Aug. 17, 2019 (Aug. 17, 2019),XP051770313. 8 pages.

NEC: "Reuse of conditional handover for SCG change in NR-DC" 3GPP Draft; R2-1909144_NRDC COND SCG CH, vol. RAN WG2, No. Prague, Czech Republic;Aug. 26, 2019-Aug. 30, 2019 Aug. 15, 2019 (Aug. 15, 2019), XP051766952. 3 pages.

NTT Docomo et al "Support of Conditional PSCell addition/ change",3GPP Draft; R2-1911344 RAN WG2 Aug. 16, 2019, XP051769101. 3 pages.

Supplementary European Search Report in the European application No. 19947866.0, mailed on Mar. 24, 2022. 12 pages.

Written Opinion of the International Search Authority in the international application No. PCT/CN2019/109385, mailed on Jul. 1, 2020. 8 pages with English translation.

Intel Corporation. "NR Mobility Enhancements", 3GPP TSG RAN meeting #85 RP-192278, Newport Beach, USA, Sep. 16-20, 2019, The first 2.1.2—section 2.4.2.

International Search Report in the international application No. PCT/CN2019/109385, mailed on Jul. 1, 2020.

Second Office Action of the Chinese application No. 202110507847.9, issued on Aug. 10, 2022. 15 pages with English translation.

Examination Report of the Indian application No. 202117046826, issued on May 13, 2022. 5 pages with English Translation.

First Office Action of the Japanese application No. 2021-577830, issued on Jul. 21, 2023, 6 pages with English translation.

OPPO, "Failure handling for conditional PScell change and addition"[online], 3GPP TSG RAN WG2 #108 R2-1915153, Nov. 22, 2019, section 2 Proposal 2, 3 pages.

NTT Docomo, Inc. "Status Report to TSG", 3GPP TSG RAN meeting #76 RP-171137, West Palm Beach, USA, Jun. 5-8, 2017, the whole document. 218 pages.

Notice of Allowance of the Singaporean application No. 11202114131U, issued on Feb. 14, 2024. 6 pages.

First Office Action of the Korean application No. 10-2021-7041222, issued on Mar. 18, 2025, 11 pages with English translation.

First Office Action of the Brazilian application No. BR1120220006470, issued on May 26, 2026.

* cited by examiner

METHOD, APPARATUS AND DEVICE FOR PROCESSING SECONDARY NODE (SN) RADIO RESOURCE CONTROL (RRC) MESSAGE, AND STORAGE MEDIUM

CROSS-REFERENCE TO RELATED APPLICATIONS

The application is a continuation application of PCT Application No. PCT/CN2019/109385 filed on Sep. 30, 2019, the disclosure of which is hereby incorporated by reference in its entity.

BACKGROUND

The Third Generation Partnership Project (3GPP) has carried out researches and developments of New Radio (NR) systems.

In an NR system, Multi-RAT Dual Connectivity (MR-DC) scenarios are supported. In the dual connectivity scenarios, User Equipment (UE) simultaneously establishes a dual connection with a Master Node (source MN) and a Secondary Node (SN), the MN provides a primary cell (PSCell), and the SN provides a secondary cell (PSCell). Herein, a PSCell change can occur within a same SN, or between different SNs (i.e., a source SN and a target SN).

Since a concept of conditional handover is introduced in the PSCell change, the PSCell change is no longer fully controlled by a network side. That is, the network side (the source MN and the source SN) cannot accurately know when the UE satisfies a conditional PSCell change. Thus, there is a scenario that the source SN continues sending the SN RRC message to the UE, and how the UE processes the SN RRC message during the PSCell change is an urgent problem need to be solved.

SUMMARY

The present disclosure relates to the technical field of mobile communications, and particularly to, a solution for processing a Secondary Node Radio Resource Control (SN RRC) message during a Primary Secondary Cell (PSCell) change.

The embodiments of the present disclosure provide a method and device for processing an SN RRC message, and a storage medium. The technical solutions are as follows.

According to an aspect of the present disclosure, there is provided a method for processing an SN RRC message, the method including: when it is determined that a triggering condition is satisfied, performing, by User Equipment (UE), a first Primary Secondary Cell (PSCell) change; and stopping, by the UE, receiving a first SN RRC message from a source Secondary Node during the first PSCell change.

According to an aspect of the present disclosure, there is provided a device for processing an SN RRC message, the device including: a memory storing processor-executable instructions; and a processor configured to execute the stored processor-executable instructions to perform operations of: when it is determined that a triggering condition is satisfied, performing a first Primary Secondary Cell (PSCell) change; and stopping receiving a first SN RRC message from a source Secondary Node (SN) during the first PSCell change.

According to an aspect of the present disclosure, there is provided a non-transitory computer-readable storage medium having stored thereon computer-executable instructions that, when executed by a processor of User Equipment (UE), cause the UE to perform operations of: when it is determined that a triggering condition is satisfied, performing, by User Equipment (UE), a first Primary Secondary Cell (PSCell) change; and stopping, by the UE, receiving a first Secondary Node Radio Resource Control (SN RRC) from a source Secondary Node (SN) during the first PSCell change.

BRIEF DESCRIPTION OF THE DRAWINGS

In order to describe the technical solutions of the embodiments of the present disclosure more clearly, the drawings required to be used for description of the embodiments will be simply introduced below. Apparently, the drawings described below are only provided for some embodiments of the present disclosure. For those skilled in the art, other drawings may further be obtained according to these drawings without creative work.

DETAILED DESCRIPTION

In order to make the objectives, technical solutions, and advantages of the present disclosure more clearly, the following will further describe the embodiments of the present disclosure in detail with reference to the accompanying drawings.

The communication system and business scenarios described in the embodiments of the present disclosure are intended to more clearly illustrate the technical solutions of the embodiments of the present disclosure, and do not constitute a limitation to the technical solutions provided by the embodiments of this application. Those of ordinary skill in the art will know that with the evolution of the communication system and the emergence of new business scenarios, the technical solutions provided in the embodiments of the present disclosure are equally applicable to similar technical problems.

Figure 1:
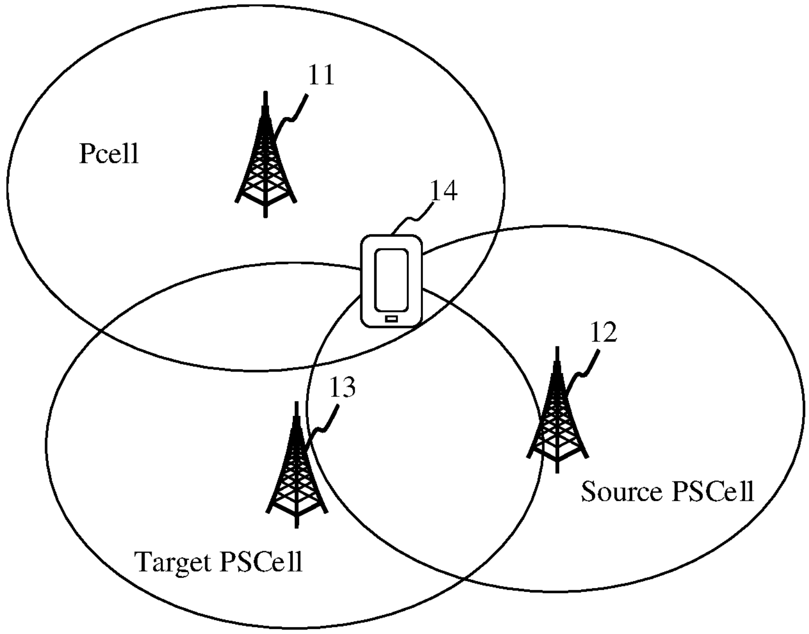
FIG. 1 is a block diagram of a communication system according to an exemplary embodiment of the present disclosure.
Figure 2:
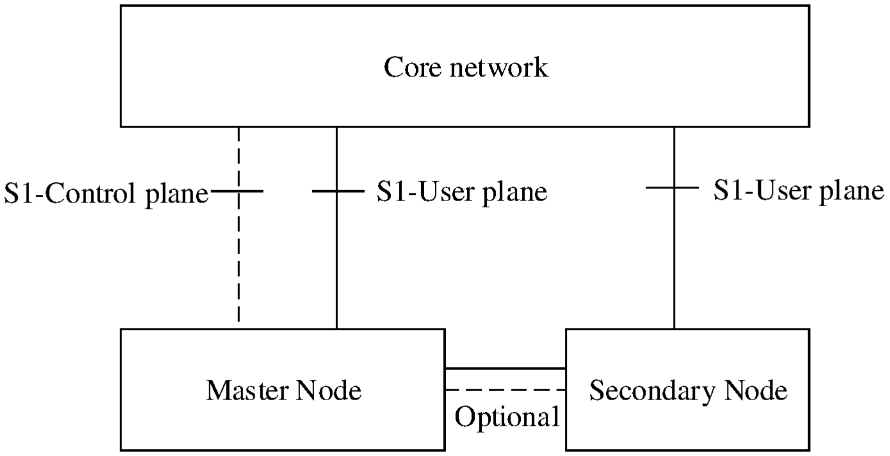
FIG. 2 is a block diagram of a communication system according to an exemplary embodiment of the present disclosure.
Figure 3:
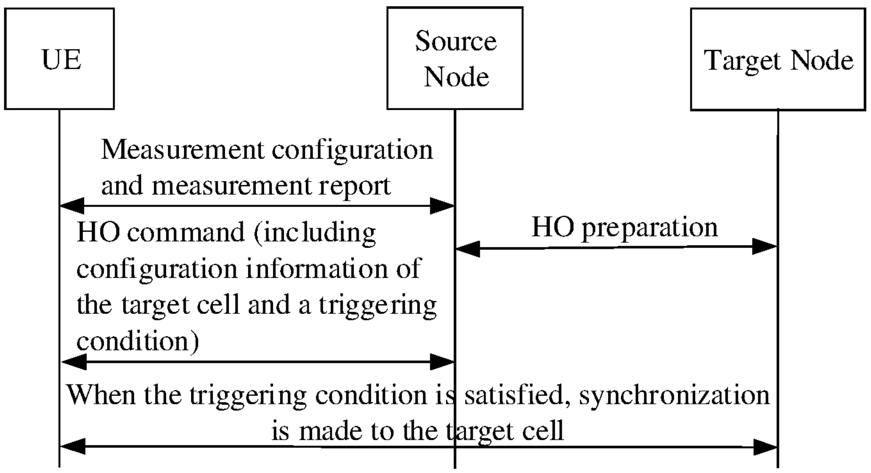
FIG. 3 is a flowchart of a conditional PScell change according to an exemplary embodiment of the present disclosure.

FIG. 1 and FIG. 2 are block diagrams of a communication system according to an exemplary embodiment of the present disclosure. The communication system may include: a first access network device 11, a second access network device 12, and a third access network device 13 and UE 14.

The first access network device 11 is a source MN. The first access network device 11 is a base station corresponding to a primary cell.

The second access network device 12 is a source SN. The second access network device 12 is a base station corresponding to a source PSCell.

The third access network device 13 is a target SN. The third access network device 13 is a base station corresponding to a target PSCell. In some embodiments, the source SN and the target SN can be a same SN.

In a Multi-RAT Dual Connectivity (MR-DC) scenario, referring to FIG. 2, a master node (source MN) and a secondary node (SN) are connected to a core network. Taking an EN-DC scenario as an example, a control plane connection via an S1 interface and a user plane connection via the S1 interface are established between the master node and the core network; a user plane connection via the S1 interface is established between the secondary node and the core network. A user plane connection is also established between the master node and the secondary node, and optionally a control plane connection is also established between the master node and the secondary node.

Multiple dual connection forms are supported in the MR-DC scenario.

1. E-UTRA-NR Dual Connectivity (EN-DC)

The core network is a 4G core network, that is, an Evolved Packet Core (EPC), the master node is an eNB in a 4G system, and the secondary node is a gNB in a 5G system.

2. NG-RAN E-UTRA-NR Dual Connectivity (NREN-DC)

The core network is a next generation core network (5GC), the master node is an eNB (eLTE eNB) of an evolved 4G system, and the secondary node is an NR gNB in a 5G system.

3. NR-E-UTRA Dual Connectivity (NR-DC)

The core network is a next-generation core network, the master node is an NR gNB, and the secondary node is another NR gNB.

4. NR-E-UTRA Dual Connectivity (NE-DC)

The core network is a next-generation core network, the master node is an NR gNB, and the secondary node is an eNB (eLTE eNB) in an evolved 4G system.

In an initial state, the UE 14 has a first connection with the source MN and a second connection with the source SN, that is, a dual connection. During a conditional PScell change, the UE needs to switch from the source PSCell to the target PSCell.

Handover Triggered Based on a Condition (Conditional Handover)

To solve the problem that there are frequent handovers and handover failures in high-speed mobility scenarios and high-frequency deployment scenarios, the 3GPP has introduced a conditional handover for LTE and NR systems. The basic principle is as follows. UE performs handover to a target cell according to a pre-configured handover command (i.e., triggering the random access process and sending handover complete message) when evaluating a triggering condition related to the target cell according to a condition configured by the network side, so as to avoid the problem of having not enough time or unable to send measurement reports and receive the handover command due to moving with high speed into areas with poor coverage.

As illustrated in FIG. 2, the process includes: a source base station sends measurement configurations of the target cell to the UE. The UE reports the measurement report of the target cell to the source base station. The source base station sends the handover preparation to the target base station according to the measurement report. The source base station also sends a handover command to the UE, and the handover command includes a triggering condition related to the target cell (or beam). The UE triggers handover from the source PSCell to the target PSCell when the triggering condition related to the target cell is triggered.

According to FIG. 2, since the concept of conditional handover is introduced in the PSCell change process, the PSCell change is no longer fully controlled by the network side, that is, the network side (source MN and source SN) cannot accurately know when the user equipment (UE) satisfies a conditional PScell change. Thus, there is a scenario that the source SN continues sending the SN RRC message to the UE, and how the UE processes the SN RRC message during the PSCell change is an urgent problem to be solved.

For a conditional PScell change, the present disclosure provides embodiments in which the UE processes the SN RRC message. The embodiments include at least one of the following three processing manners.

In a first processing manner, during a PSCell change, the UE stops receiving a first SN RRC message sent by the source SN.

In a second processing manner, during a PSCell change, the UE receives a second SN RRC message containing a PSCell change instruction from the source MN, and performs the PSCell change instruction.

In a third processing manner, during a PSCell change, the UE receives a second SN RRC message containing a source PSCell reconfiguration message from the source MN, and ignores the PSCell reconfiguration message.

Among them, the SN RRC message in the first processing manner is a first SN RRC message transmitted by the source SN on a Signal Radio Bearer (SRB) 3. The SN RRC message in the second processing manner and the third processing manner is a second SN RRC message transmitted by the source MN on the SRB 1. The UE determines to ignore or respond to the second SN RRC message according to a type of the second SN RRC message.

For the first processing manner (the UE stops receiving the SN RRC message on the SRB3 during the PSCell change), an embodiment is described as follows.

Figure 4:
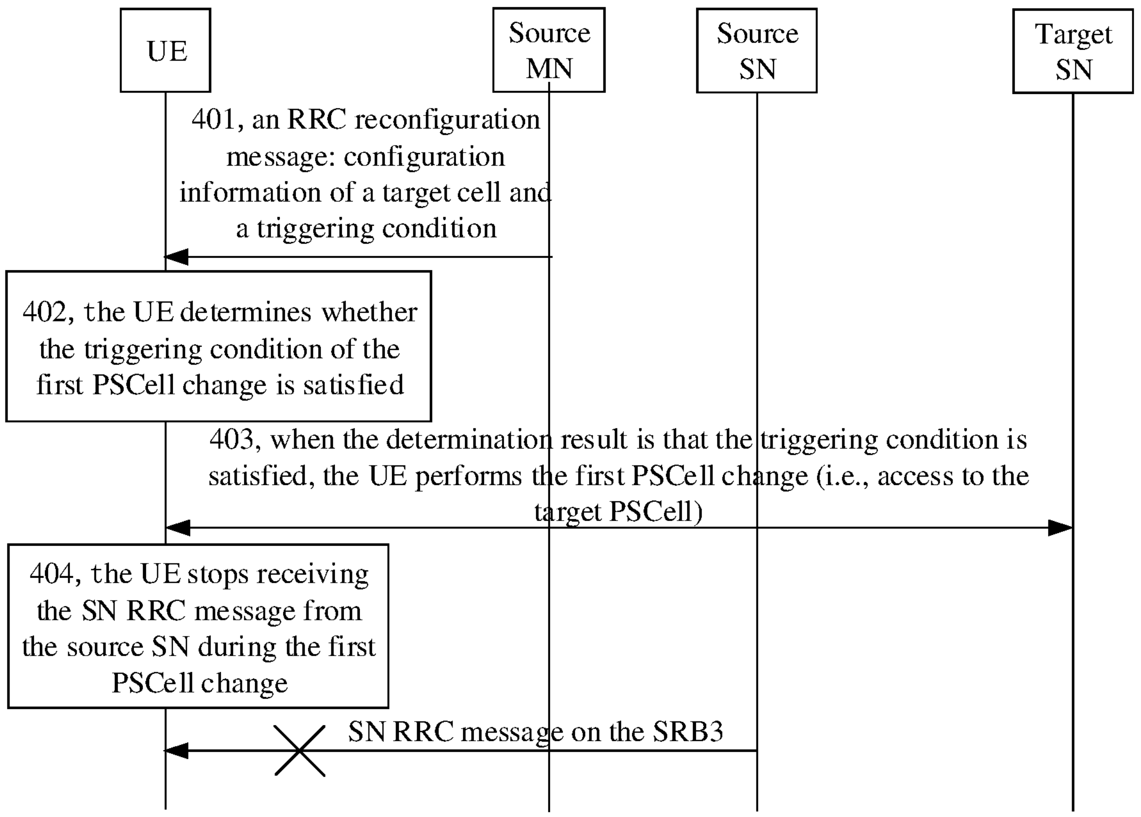
FIG. 4 is a flowchart of a method for processing an SN RRC message according to an exemplary embodiment of the present disclosure.

FIG. 4 shows a flowchart of a method for processing an SN RRC message according to an exemplary embodiment of the present disclosure. The method may be used in the communication system shown in FIG. 1, and the method includes operations as follows.

In operation 401, a master node sends an RRC reconfiguration message to UE, where the RRC reconfiguration message carries configuration information of a target PSCell and a triggering condition.

The configuration information of the target PSCell includes but is not limited to at least one of the following information: Medium Access Control (MAC) parameters of the target PSCell, Radio Resource Control (RRC) parameters of the target PSCell, Packet Data Convergence Protocol (PDCP) layer parameters of the target PSCell, measurement configuration of the target PSCell, etc.

The triggering condition is a triggering condition for the first conditional PSCell change, or the triggering condition is a triggering condition for a conditional handover to a target PSCell. For example, the triggering condition includes at least one of: a measurement event A3, a measurement event A5, or a measurement event A6.

The source master node configures, on the SRB 1 for the UE in a connected state, configuration information of the target PSCell and the triggering condition of the first PSCell change.

As another example, an RRC reconfiguration message may be sent by the source SN on the SRB 3 to the UE in the connected state. The RRC reconfiguration message carries the configuration information of the target PSCell and the triggering condition of the first PSCell change.

In operation 402, the UE determines whether the triggering condition of the first PSCell change is satisfied.

When the triggering condition is satisfied, proceed to operation 403; when the triggering condition is not satisfied, operation 402 is continued.

In operation 403, when the determination result is that the triggering condition is satisfied, the UE performs the first PSCell change (i.e., access to the target PSCell).

When triggering condition is satisfied, the UE starts to perform the change procedure from the source PSCell to the target PSCell.

In operation 404, the UE stops receiving the SN RRC message from the source SN during the first PSCell change.

That is, the UE stops receiving the SN RRC message transmitted by the source SN via the SRB 3.

To sum up, according to the method provided in the embodiment, during a conditional PScell change, the UE does not receive the SN RRC message transmitted by the source SN via the SRB3, it is thus possible to avoid conflicts between the SN RRC message of the source SN and the ongoing first PSCell change. In addition, since a part of the Radio Frequency (RF) channel of the UE has already started to synchronize the target PSCell, not monitoring the SN RRC message transmitted by the source SN via the SRB3 can prevent the UE from adding another RF channel for monitoring. It is thus possible to reduce hardware complexity and power consumption of the UE and eliminate the need to adding additional capabilities to the UE.

For the above second processing manner (during the PSCell change, the UE receives the PSCell change instruction from the source MN, and performs the received instruction), an embodiment is described as follows.

Figure 5:
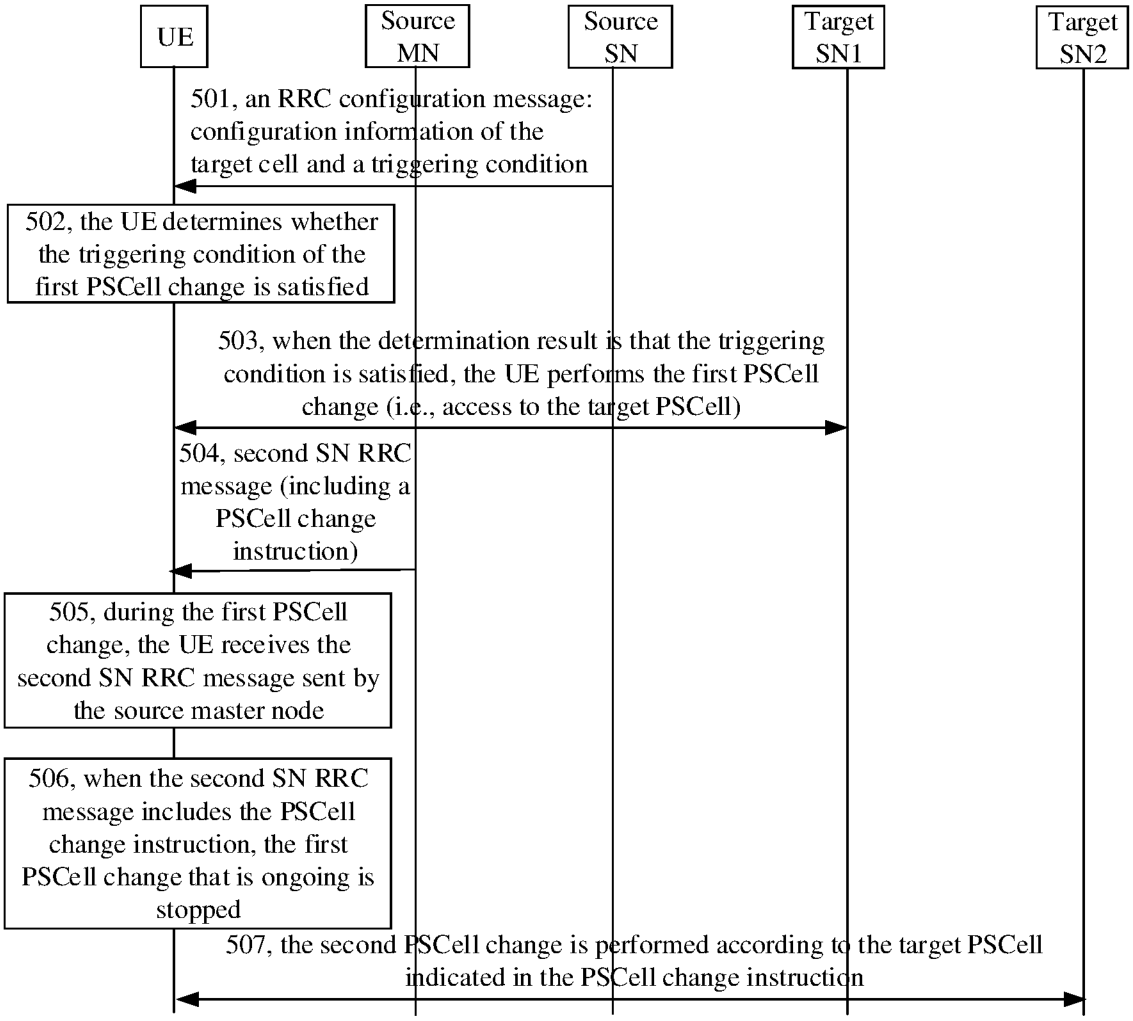
FIG. 5 is a flowchart of a method for processing an SN RRC message according to an exemplary embodiment of the present disclosure.

FIG. 5 shows a flowchart of a method for processing an SN RRC message provided by an exemplary embodiment of the present disclosure. The method may be used in the communication system shown in FIG. 1, and the method includes operations as follows.

In operation 501, a source SN sends an RRC reconfiguration message to the UE, where the RRC reconfiguration message carries configuration information of a target PSCell and a triggering condition.

The configuration information of the target PSCell includes but is not limited to at least one of the following information: parameters of Medium Access Control (MAC) layer of the target PSCell, parameters of Radio Resource Control (RRC) layer of the target PSCell, Packet Data Convergence Protocol (PDCP) layer parameters of the target PSCell, measurement configuration of the target PSCell, etc.

The triggering condition is a triggering condition for the first conditional PScell change, or the triggering condition is a triggering condition for a conditional handover to a target PSCell. For example, the triggering condition includes at least one of: a measurement event A3, a measurement event, A5 or a measurement event A6.

The source SN sends an RRC reconfiguration message on the SRB 3 to the UE in the connected state. The RRC reconfiguration message carries the configuration information of the target PSCell and the triggering condition for the first PSCell change.

As another example, the source master node may also send an RRC reconfiguration message on SRB 1 to the UE in the connected state.

In operation 502, the UE determines whether the triggering condition of the first PScell change is satisfied.

When triggering condition is satisfied, proceed to operation 503; when the triggering condition is not satisfied, operation 502 is continued.

In operation 503, when the determination result is that the triggering condition is satisfied, the UE performs the first PSCell change (access to the target PSCell).

When triggering condition is satisfied, the UE starts to perform the change procedure from the source PSCell to the target PSCell.

In operation 504, the source master node sends a second SN RRC message to the UE.

The source master node sends a second SN RRC message to the UE on SRB1. There are two types of second SN RRC messages.

The first type of second SN RRC message is a PSCell change instruction, which is used to instruct the UE to perform handover from the source PSCell to another PSCell.

The second type of second SN RRC message is a source PSCell reconfiguration message, which is used to instruct the UE to reconfigure all or part of the parameters of the source PSCell.

Herein, when the second SN RRC message carries a target field, it belongs to the first type; when the second SN RRC message does not carry the target field, it belongs to the second type. Exemplarily, the target field is a reconfigurationWithSync field.

In operation 505, during the first PSCell change, the UE receives the second SN RRC message from the source master node.

During the first PSCell change, the UE continues to monitor the SN RRC message transmitted by the source MN via SRB1. That is, the UE receives the second SN RRC message transmitted by the source master node on the SRB1.

When the second SN RRC message carries a target field, the UE determines that the second SN RRC message includes the PSCell change instruction. When the second SN RRC message does not carry the target field, the UE determines that the second SN RRC message is the source PSCell reconfiguration message.

Herein, the target field is a reconfigurationWithSync field.

In operation 506, when the second SN RRC message includes the PSCell change instruction, the first PSCell change that is ongoing is stopped.

In operation 507, a second PSCell change is performed according to a target PSCell indicated in the PSCell change instruction.

Assuming that the first PSCell change is a handover from the source PSCell to a first target PSCell, and the second PSCell change is a handover from the source PSCell to a second target PSCell.

After receiving the PSCell change instruction, the UE stops handover from the source PSCell to the first target PSCell, and performs handover according to the target PSCell (the second PSCell) indicated in the PSCell change instruction.

It should be noted that the PSCell change may be triggered by the source MN or the source SN.

To sum up, according to the method provided in the embodiment, during conditional PScell change, the UE still maintains a connection with the source MN, thus it can receive the PSCell change instruction from the source MN and execute the received instruction. It is possible to ensure, to a greater extent, that the PSCell change is controlled by the network side, that is, the priority of the second PSCell change triggered by the network side is higher than the priority of the first conditional PSCell change triggered by the UE side.

It should be noted that in other possible embodiments, the UE may also ignore the PSCell change instruction from the source MN, and continue the first PSCell change that is ongoing. Then, the priority of the second PSCell change triggered by the network side is lower than the priority of the first conditional PScell change triggered by the UE side.

For the above third processing manner (the UE receives the source PSCell reconfiguration instruction from the source MN during the PSCell change, but does not execute it), an embodiment is described with reference to FIG. 6.

In operation 501, a source SN sends an RRC reconfiguration message to UE, where the RRC reconfiguration message carries configuration information of a target PSCell and a triggering condition.

In operation 502, the UE determines whether the triggering condition for the first PSCell change is satisfied;

When triggering condition is satisfied, proceed to operation 503; when the triggering condition is not satisfied, operation 502 is continued.

In operation 503, when the determination result is that the triggering condition is satisfied, the UE performs the first PSCell change (i.e., access to the target PSCell).

In operation 504, the source master node sends a second SN RRC message to the UE.

In operation 505, during the first PSCell change, the UE receives the second SN RRC message sent by the source master node.

For the description of the foregoing operations 501 to 505, reference may be made to FIG. 5, and details are not repeated herein.

In operation 508, when the second SN RRC message is a source PSCell reconfiguration message, the UE continues the first PSCell change that is ongoing, and ignores the second SN RRC message.

Since the second SN RRC message is a message used for reconfiguring the source PSCell and the source PSCell no longer provides service to the UE after the handover to the target PSCell, the UE ignores the second SN RRC message and does not respond to it.

To sum up, according to the method provided in this embodiment, during the conditional PScell change, the UE still maintains a connection with the source MN, and therefore the UE can still receive the RRC message from the source MN. The source PSCell reconfiguration instruction sent by the source MN is received but not executed, because the source PSCell reconfiguration instruction conflicts with the ongoing access to the target PSCell, which is thus ignored by the UE to avoid the conflict.

The above three embodiments can be implemented individually, or in combination of two, or in combination of the three, which is not limited in the present disclosure. The aforementioned first PSCell change is the PSCell change triggered based on a pre-configured condition. The "Change" includes addition or change.

Figure 6:
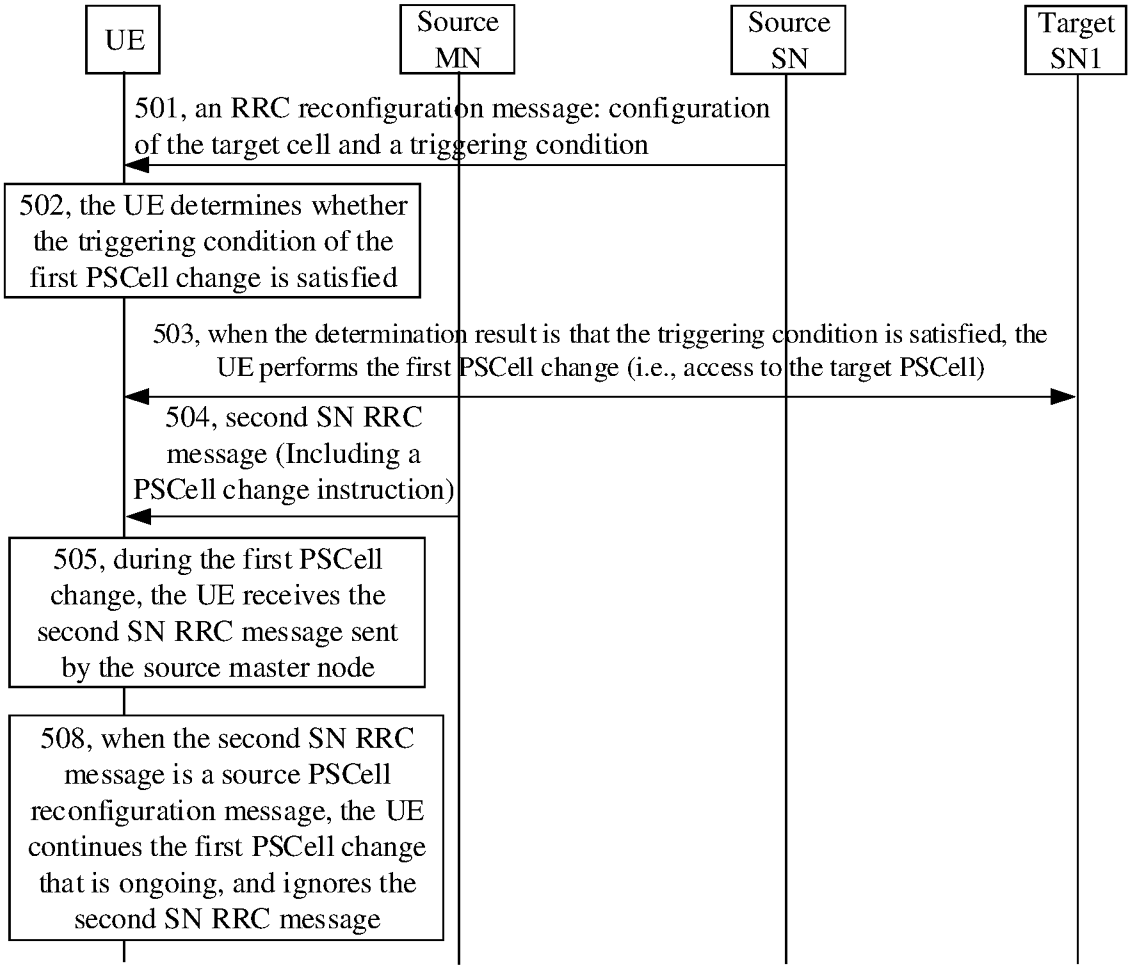
FIG. 6 is a flowchart of a method for processing an SN RRC message according to an exemplary embodiment of the present disclosure.

FIG. 6 shows a block diagram of a device for processing an SN RRC message provided by an exemplary embodiment of the present disclosure. The device includes a receiving module 620.

The receiving module 620 is configured to stop receiving the first SN RRC message from the source SN during the first PSCell change.

In an alternative embodiment, the first SN RRC message is the SN RRC message sent on SRB3.

In an alternative embodiment, the device further includes: a change module 640.

The receiving module 620 is further configured to receive the second SN RRC message from the source MN during the first PSCell change;

The change module 640 is configured to: when the second SN RRC message includes a PSCell change instruction, stop the first PSCell change that is ongoing, and perform the second PSCell change according to the target PSCell indicated in the PSCell change instruction.

In an alternative embodiment, the device further includes a determining module 660.

The determining module 660 is configured to: when the second SN RRC message carries a target field, determine that the second SN RRC message includes the PSCell change instruction.

In an alternative embodiment, the device further includes: a change module 640.

The receiving module 620 is configured to receive a second SN RRC message from the source MN during the first PSCell change.

The change module 640 is configured to: continue the first PSCell change that is ongoing, and ignore the second SN RRC message when the second SN RRC message is a source PSCell reconfiguration message.

In an alternative embodiment, the device further includes a determining module 660.

The determining module 660 is configured to: when the second SN RRC message dose not carry a target field, determine that the second SN RRC message is a source PSCell reconfiguration message.

In an alternative embodiment, the second SN RRC message is an SN RRC message sent on SRB 1.

In an alternative embodiment, the target field is a reconfigurationWithSync field.

In an alternative embodiment, the first PSCell change is a PSCell change triggered based on a pre-configured condition.

It should be noted that the processing functions of the various (three) SN RRC messages of the foregoing modules can be implemented individually or in combination into different embodiments, which are not limited in the embodiments of the present disclosure. Examples are given as follows.

The receiving module 620 is configured to receive the second SN RRC message from the source MN during the PSCell change; and the change module 640 is configured to ignore or respond to the second SN RRC message according to a type of the second SN RRC message.

In an alternative embodiment, the change module 640 is configured to: when the second SN RRC message includes a PSCell change instruction, stop the first PSCell change that is ongoing, and perform a second PSCell change according to the target PSCell indicated in the PSCell change instruction; or, when the second SN RRC message is a source PSCell reconfiguration message, continue the first PSCell change that is ongoing, and ignore the second SN RRC message.

In an alternative embodiment, the second SN RRC message is an SN RRC message transmitted on the SRB 1.

In an alternative embodiment, the determining module 660 is configured to: when the second SN RRC message carries a target field, determine that the second SN RRC message includes the PSCell change instruction; and when the second SN RRC message does not carry the target field, determine that the second SN RRC message is the source PSCell reconfiguration message.

Figure 7:
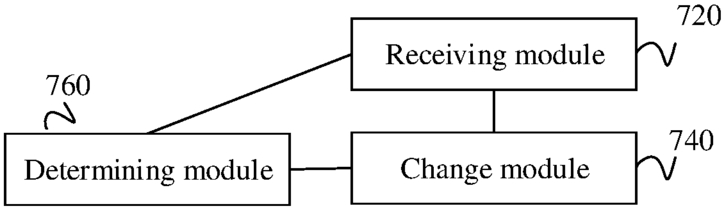
FIG. 7 is a block diagram of a device for processing an SN RRC message according to an exemplary embodiment of the present disclosure.
Figure 8:
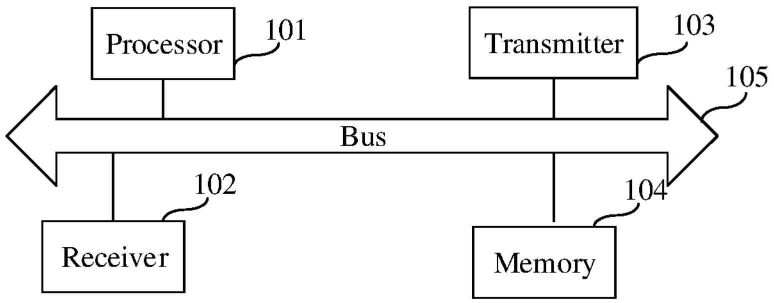
FIG. 8 is a block diagram of a communication device according to an exemplary embodiment of the present disclosure.

FIG. 7 shows a schematic structural diagram of a communication device (UE or access network device) provided by an exemplary embodiment of the present disclosure. The UE includes a processor 101, a receiver 102, a transmitter 103, a memory 104, and a bus 105.

The processor 101 includes one or more processing cores, and the processor 101 executes various functional applications and information processing by running software programs and modules.

The receiver 102 and the transmitter 103 may be implemented as a communication component, and the communication component may be a communication chip.

The memory 104 is connected to the processor 101 through a bus 105.

The memory 104 may be used to store at least one instruction, and the processor 101 is used to execute the at least one instruction to implement each operation in the foregoing method embodiment.

In addition, the memory 104 can be implemented by any type of volatile or non-volatile storage device or a combination thereof. The volatile or non-volatile storage device includes, but is not limited to: magnetic disks or optical disks, electrically erasable and programmable Read-only memory (EEPROM), erasable programmable read-only memory (EPROM), static anytime access memory (SRAM), read-only memory (ROM), magnetic memory, flash memory, programmable read-only memory (PROM).

In an exemplary embodiment, there is further provided a computer-readable storage medium. The computer-readable storage medium stores at least one instruction, at least one program, code set, or instruction set, the at least one instruction, the At least one piece of program, the code set or the instruction set is loaded and executed by the processor to implement the SN RRC message processing method executed by the UE provided in the foregoing method embodiments.

In an exemplary embodiment, there is further provided a computer program product. The computer program product stores at least one instruction, at least one program, code set, or instruction set, the at least one instruction, the at least one program, the code set or instruction set is loaded and executed by the processor to implement the SN RRC message processing method executed by the UE provided in the foregoing method embodiments.

Those of ordinary skill in the art can understand that all or part of the operations in the foregoing embodiments can be implemented by hardware, or by completed a program instructing related hardware. The program can be stored in a computer-readable storage medium. The storage medium mentioned can be a read-only memory, a magnetic disk or an optical disk, etc.

The above are only alternative embodiments of the present disclosure and not intended to limit the scope of protection of the present disclosure. Any modification, equivalent substitution, improvement, etc. made within the spirit and principle of the present disclosure shall be included in the protection of this application within range.

The invention claimed is:

1. A method for processing a Secondary Node Radio Resource Control (SN RRC) message, comprising:

when User Equipment (UE) determines that a triggering condition is satisfied, performing, by the UE, a first Primary Secondary Cell (PSCell) change; and stopping, by the UE, receiving a first SN RRC message from a source Secondary Node (SN) during the first PSCell change, wherein the first SN RRC message is an SN RRC message transmitted on a Signaling Radio Bearer 3 (SRB3), and wherein the UE in a connected state receives a Radio Resource Control (RRC) reconfiguration message sent by the source SN on the SRB3, the RRC reconfiguration message carrying configuration information of a target PSCell and the triggering condition of the first PSCell change.

2. The method of claim 1, wherein the triggering condition is a triggering condition of the first PSCell change that is a conditional PSCell change.

3. The method of claim 1, further comprising:

receiving, by the UE, a second SN RRC message from a source Master Node (MN) during the first PSCell change; and when the second SN RRC message comprises a PSCell change instruction, stopping the first PSCell change that is ongoing, and performing access according to a target PSCell indicated in the PSCell change instruction.

4. The method of claim 3, further comprising:

when the second SN RRC message carries a target field, determining, by the UE, that the second SN RRC message comprises the PSCell change instruction.

5. The method of claim 1, wherein the first PSCell change is a PSCell change triggered based on a pre-configured condition.

6. A device for processing a Secondary Node Radio Resource Control (SN RRC) message, comprising:

a memory storing processor-executable instructions; and a processor configured to execute the stored processor-executable instructions to perform operations of:

when the device determines that a triggering condition is satisfied, performing a first Primary Secondary Cell (PSCell) change; and stopping receiving a first SN RRC message from a source Secondary Node (SN) during the first PSCell change, wherein the first SN RRC message is an SN RRC message transmitted on a Signaling Radio Bearer 3 (SRB3), and wherein the device in a connected state receives a Radio Resource Control (RRC) reconfiguration message sent by the source SN on the SRB3, the RRC reconfiguration message carrying configuration information of a target PSCell and the triggering condition of the first PSCell change.

7. The device of claim 6, wherein the triggering condition is a triggering condition of the first PSCell change that is a conditional PSCell change.

8. The device of claim 6, wherein the first PSCell change is a PSCell change triggered based on a pre-configured condition.

9. The device of claim 6, wherein the device receives a second SN RRC message from a source Master Node (MN) during the first PSCell change; and when the second SN RRC message comprises a PSCell change instruction, the processor is configured to execute the stored processor-executable instructions to further perform operations of: stopping the first PSCell change that is ongoing, and performing access according to a target PSCell indicated in the PSCell change instruction.

10. The device of claim 9, wherein the processor is configured to execute the stored processor-executable instructions to further perform an operation of:

when the second SN RRC message carries a target field, determining that the second SN RRC message comprises the PSCell change instruction.

11. A non-transitory computer-readable storage medium having stored thereon computer-executable instructions that, when executed by a processor of User Equipment (UE), cause the UE to perform operations of:

when the UE determines that a triggering condition is satisfied, performing, by User Equipment (UE), a first Primary Secondary Cell (PSCell) change; and stopping, by the UE, receiving a first Secondary Node Radio Resource Control (SN RRC) message from a source Secondary Node (SN) during the first PSCell change, wherein the first SN RRC message is an SN RRC message transmitted on a Signaling Radio Bearer 3 (SRB3), and wherein the UE in a connected state receives a Radio Resource Control (RRC) reconfiguration message sent by the source SN on the SRB3, the RRC reconfiguration message carrying configuration information of a target PSCell and the triggering condition of the first PSCell change.

12. The non-transitory computer-readable storage medium of claim 11, wherein the triggering condition is a triggering condition of the first PSCell change that is a conditional PSCell change.

13. The non-transitory computer-readable storage medium of claim 11, wherein the first PSCell change is a PSCell change triggered based on a pre-configured condition.

14. The non-transitory computer-readable storage medium of claim 11, wherein the UE is caused to further perform operations of:

receiving, by the UE, a second SN RRC message from a source Master Node (MN) during the first PSCell change; and when the second SN RRC message comprises a PSCell change instruction, stopping the first PSCell change that is ongoing, and performing access according to a target PSCell indicated in the PSCell change instruction.

15. The non-transitory computer-readable storage medium of claim 14, wherein the UE is caused to further perform operations of:

when the second SN RRC message carries a target field, determining, by the UE, that the second SN RRC message comprises the PSCell change instruction.

* * * * *